(12) United States Patent
Kobres et al.

(10) Patent No.: US 9,355,277 B2
(45) Date of Patent: May 31, 2016

(54) INSTALLABLE SECRET FUNCTIONS FOR A PERIPHERAL

(71) Applicants: Erick Christian Kobres, Lawrenceville, GA (US); Ron William Rogers, Suwanee, GA (US)

(72) Inventors: Erick Christian Kobres, Lawrenceville, GA (US); Ron William Rogers, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 48 days.

(21) Appl. No.: 13/780,160

(22) Filed: Feb. 28, 2013

(65) Prior Publication Data

US 2014/0241523 A1 Aug. 28, 2014

Related U.S. Application Data

(60) Provisional application No. 61/720,645, filed on Oct. 31, 2012, provisional application No. 61/695,978, filed on Aug. 31, 2012.

(51) Int. Cl.
*G06F 21/00* (2013.01)
*G06F 21/71* (2013.01)

(52) U.S. Cl.
CPC ...................................... *G06F 21/71* (2013.01)

(58) Field of Classification Search
None
See application file for complete search history.

(56) References Cited

U.S. PATENT DOCUMENTS

| | | | | |
|---|---|---|---|---|
| 5,799,068 A * | 8/1998 | Kikinis et al. | ............. | 379/93.06 |
| 6,061,449 A * | 5/2000 | Candelore | ........... | G06F 12/1408 380/28 |
| 6,836,670 B2 * | 12/2004 | Castrogiovanni et al. | .... | 455/558 |
| 6,952,777 B1 * | 10/2005 | Post | ................. | G07B 17/00733 709/218 |
| 7,213,766 B2 * | 5/2007 | Ryan | ..................... | G06F 13/385 235/472.02 |
| 7,325,134 B2 * | 1/2008 | Fascenda | ...................... | 713/169 |
| 7,529,371 B2 * | 5/2009 | Chen et al. | .................... | 380/247 |
| 7,597,250 B2 * | 10/2009 | Finn | .............................. | 235/380 |
| 7,940,932 B2 * | 5/2011 | Paksoy | .................... | G06F 21/78 380/247 |
| 8,009,830 B2 * | 8/2011 | Orsini | ..................... | H04L 9/085 380/28 |
| 8,254,578 B2 * | 8/2012 | Paksoy | .................... | G06F 21/78 380/249 |
| 8,660,943 B1 * | 2/2014 | Chirehdast | ....................... | 705/38 |
| 2005/0207577 A1 * | 9/2005 | England | ................ | H04N 5/913 380/213 |
| 2009/0198618 A1 * | 8/2009 | Chan et al. | ....................... | 705/66 |

(Continued)

OTHER PUBLICATIONS

Wang, Yu; Lu, Jun,; Wu, Zhongwang. Component Based Security Control for Information Network. IMACS Multiconference on Computational Engineering in Systems Applications. Pub. Date: 2006. Relevant pp. 1357-1360. http://ieeexplore.ieee.org/stamp/stamp.jsp?tp=&arnumber=4105593.*

(Continued)

*Primary Examiner* — Jeremiah Avery
(74) *Attorney, Agent, or Firm* — Harden E. Stevens, III; Joseph P. Mehrle

(57) ABSTRACT

There is provided a pluggable secure device identity module (SDIM) attached to a peripheral where the SDIM includes one or more secret functions provided by a third party that are used by the peripheral to provide additional security features or functions that can only be authenticated by the third party. The peripheral is attached to a computer and a secure provisioning manifest is used to authenticate and communicate with the peripheral. The computer includes a processor that executes an operating system and transaction software. A secure I/O module, that has a processor and software that is separate and isolated from the processing environment of the computer, uses the secure provisioning manifest to authenticate the peripheral and then to establish a secure encrypted session for communicating with the peripheral.

21 Claims, 10 Drawing Sheets

(56) References Cited

U.S. PATENT DOCUMENTS

| | | | |
|---|---|---|---|
| 2010/0037069 A1* | 2/2010 | Deierling | G06F 12/1433 713/193 |
| 2012/0159521 A1* | 6/2012 | Kriegelstein | G06F 9/4411 719/327 |
| 2012/0289193 A1* | 11/2012 | Bergenwall | 455/410 |

OTHER PUBLICATIONS

Xu, Jian; Pan, TieJun; Zheng, LeiNa. Design and Implementation of High Security Mobile Payment System. 2012 International Conference on Communication Systems and Network Technologies (CSNT). Pub. Date: 2012. Relevant pp. 493-497. http://ieeexplore.ieee.org/stamp/stamp.jsp?tp=&arnumber=6200693.*

Alioto, M.; Poli, M.; Rocchi, S.; Vignoli, V. A General Model of DPA Attacks to Precharged Busses in Symmetric-Key Cryptographic Algorithms. 18th European Conference on Circuit Theory and Design, 2007. ECCTD 2007. Relevant pp. 368-371. http://ieeexplore.ieee.org/stamp/stamp.jsp?tp=&arnumber=4529609.*

Srovnal, Vilem; Penhaker, Marek. Electronic Embeddes System Applications. 2010 2nd International Conference on Mechanical and Electronics Engineering (ICMEE). vol. 1. Relevant pp. vol. 1 394-398. http://ieeexplore.ieee.org/stamp/stamp.jsp?tp=&arnumber=5558521.*

Eul, Hermann. ICs for Mobile Multimedia Communications. IEEE International Conference on Solid-State Circuits, 2006. ISSCC 2006. Relevant pp. 21-39. http://ieeexplore.ieee.org/stamp/stamp.jsp?tp=& arnumber=1696031.*

Lie, David; Mitchell, John; Tekkath, Chandramohan A.; Horowitz. Specifiying and Verifying Hardware for Tamper-Resistant Software. Proceedings, 2003 Symposium Security and Privacy. Relevant pp. 166-177. http://ieeexplore.ieee.org/stamp/stamp.jsp?tp=&arnumber=1199335.*

* cited by examiner

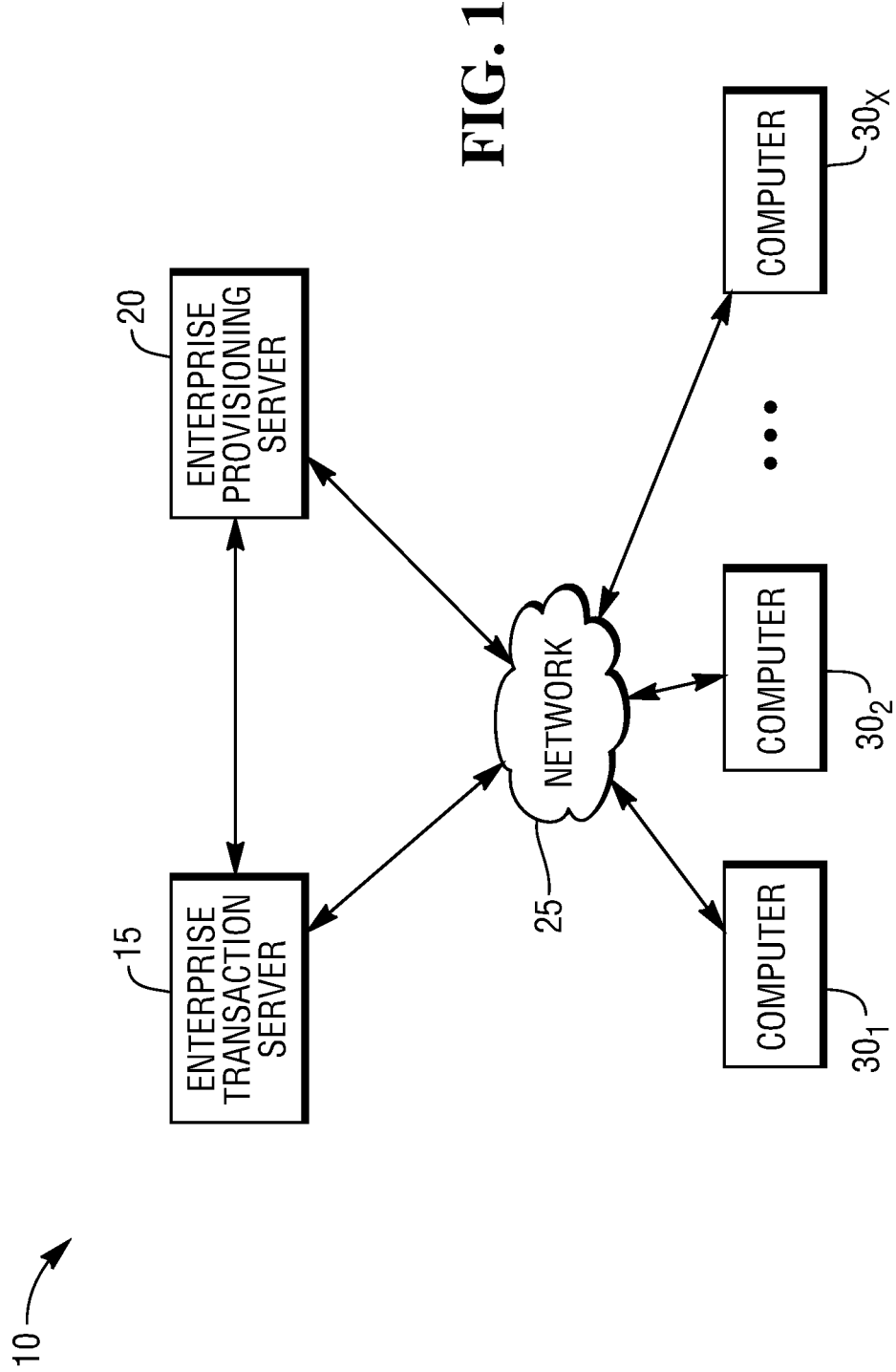

FIG. 5

SECURE PROVISIONING MANIFEST — 250

505:
1. SECURE TRANSACTION SERVICE ID
2. SECURE I/O MODULE ID
3. ISSUE DATE
4. EXPIRE DATE
5. GRACE PERIOD
6. POLICY RECORD SET 1 (PIN)
7. POLICY RECORD SET 1 (PIN)
8. POLICY RECORD SET 2 (STS)
9. POLICY RECORD SET 3 (SCAN)
10. POLICY RECORD SET 4 (MSR)
11. POLICY RECORD SET 5 (NFC)
12. POLICY RECORD SET 6 (NETWORK)

510 / 515:

| ID | PUBLIC KEY | VENDOR ID | PID | SERIAL NO. | POLICY SET |
|---|---|---|---|---|---|
| A456 | ************** | NCR | 5999 | ------ | PIN |
| S123 | ************** | NCR | 9800 | ------ | STS |
| A345 | ************** | NCR | 7899 | ------ | SCAN |
| A234 | ************** | NCR | 5949 | ------ | MSR |
| A567 | ************** | NCR | 1299 | ------ | NFC |

INSTALLABLE SECRET FUNCTIONS FOR A PERIPHERAL

CROSS-REFERENCE TO RELATED APPLICATIONS

This application claims the benefit of U.S. Provisional Application No. 61/695,978, filed Aug. 31, 2012 which is hereby incorporated by reference in its entirely. This application is also related to U.S. Provisional Application No. 61/720,645 titled "Security Module and Method of Securing Payment Information" having the same assignee as this application and which is also hereby incorporated by reference in its entirely. This application is further related to U.S. patent application Ser. No. 13/732,088 titled "A Secure Provisioning Manifest for Controlling Peripherals Attached to a Computer" having the same assignee as this application and which is hereby incorporated by reference in its entirely.

FIELD OF THE INVENTION

The present invention relates to computer terminals used to receive and process financial and/or sensitive information and more specifically to installable secret functions that are installed into peripherals attached to the computer terminals and used to input sensitive and/or financial information.

BACKGROUND

Protection of financial and/or sensitive information including payment card data, personal identification numbers (PINs) and personal identification information from fraud and theft is a problem for many companies. To deal with this problem, the Payment Card Industry (PCI) provides security guidelines for payment peripherals, such as card readers, keyboards containing card readers, and PIN entry devices. The guidelines require that such peripherals meet certain requirements for data encryption and encryption key management.

In addition to payment peripherals, there are other types of peripherals that are used to input valuable and sensitive information. For example, an optical code scanner can be used to read a barcode on a personal identification document that has sensitive personal information encoded in the barcode. In another example, a radio frequency identification (RFID) reader can be used to read an RFID chip located in a personal identification document or credit card that has sensitive financial or personal information.

These and other peripherals are used to read financial or sensitive information and certain methods and devices described herein are used to secure the information. However, third parties that will at some point receive and process the information may require additional levels of security. In some cases, a third party does not want to trust the parties that make or install the peripherals with the information used to provide the additional levels of security. These additional levels of security provided by a third party are known as secret features or functions and are required by the third party to be present in a peripheral but the manufacturer of the peripheral cannot know the specifics of the secret features or functions.

SUMMARY

Among its several aspects, the present invention seeks to overcome or ameliorate at least one of the disadvantages of the prior art, or to provide a useful alternative.

Therefore, among its several aspects, the present invention recognizes it would be desirable to provide a device for and method of providing these secret features and functions to any peripheral used to input financial and/or sensitive information.

Among its several aspects, the present invention recognizes there is an advantage to allowing a third party to create security features and functions that are secret or not specifically known to the maker or seller of the peripheral where the security features and functions are installed. Advantages of the invention include a pluggable module that can be provided by the third party where the third party has control over what security features and functions are implemented in the module.

In accordance with the teachings of the present invention, a secure device identity module (SDIM) is provided that includes secret information and secret functions provided by the third party to provide additionally levels of authentication and data protection for sensitive information processed by peripherals. The SDIM is a pluggable module that is inserted into a SDIM socket located within a peripheral. Installation of a SDIM requires that the housing of the peripheral be opened. A SDIM cannot be inserted from the outside of a peripheral. For a peripheral that is sealed, the SDIM must be installed prior to the peripheral being sealed, usually prior to deployment of the peripheral for attachment to a computer terminal. Therefore, the third party must provide the SDIMs to the manufacturer prior to the sealing of the peripherals.

In accordance with an embodiment of the present invention, there is provided a secure device identity module, a peripheral embodiment and a method that uses the secure device identity module to provide secret security features and functions from a third party. To this end, a pluggable secure device identity module that is adapted to plug into a peripheral before the peripheral is sealed and to provide secret security features and functions to the peripheral is provided. The module comprising: a memory including computer instructions and secure module identification and security information; and a processor in communication with the memory where when the processor executes the computer instructions they cause the processor to implement the features and functions of the secure device identity module which include: providing to the peripheral the secure module identification and security information in response to a request from the peripheral; and providing to the peripheral the results of a secret cryptographic function performed on data provided in a request from the peripheral to perform the function.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

FIG. 1 is a high-level block diagram illustrating an embodiment of a transaction system that implements a secure provisioning manifest.

FIG. 5 is a high-level diagram illustrating a secure provisioning manifest.

DETAILED DESCRIPTION

Figure 2A:
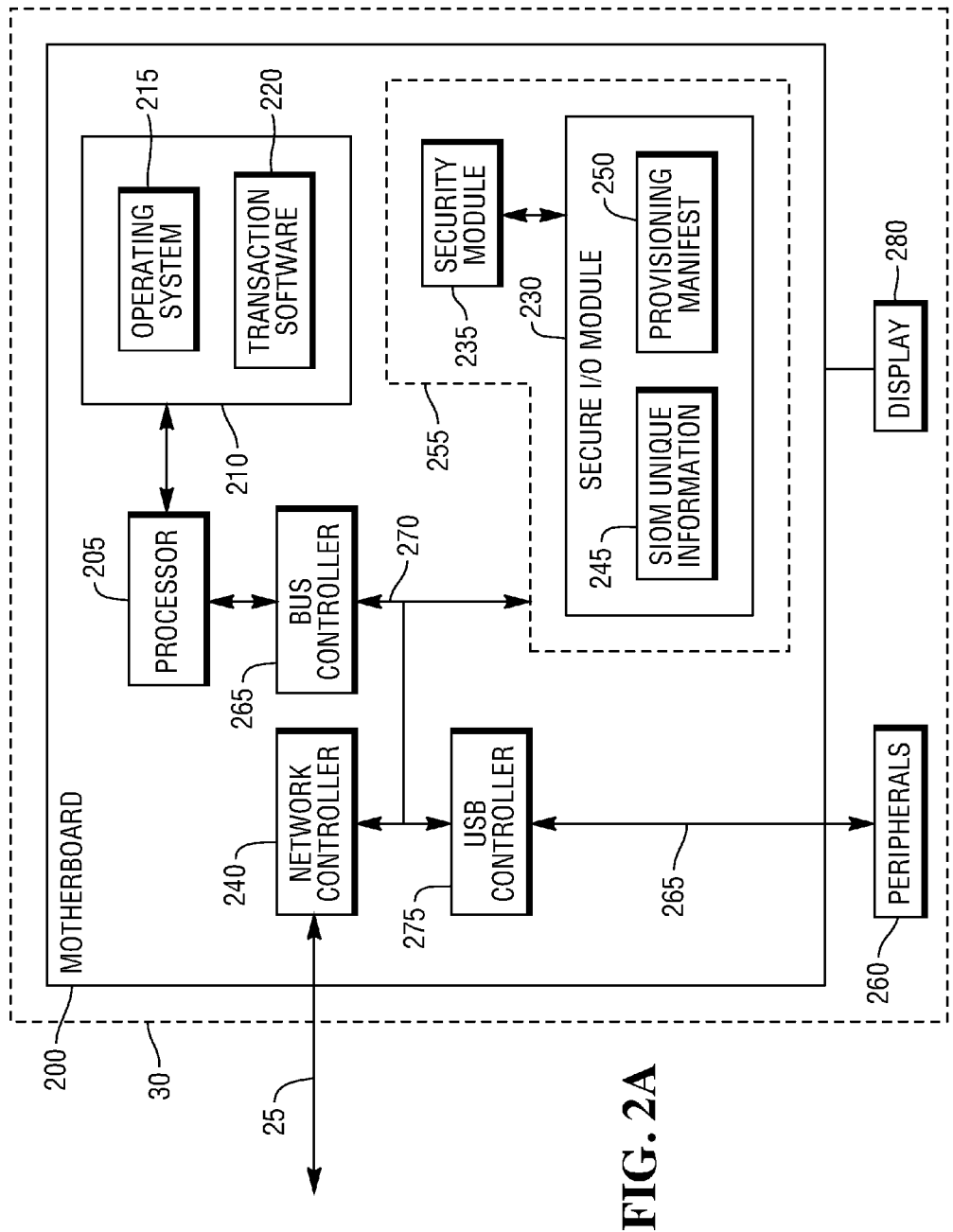
FIG. 2A is a high-level block diagram illustrating selected hardware and software components of a transaction computer.

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

With reference to FIG. 1, there is provided a transaction system 10 including an enterprise transaction server 15 and an enterprise provisioning server 20 where each server is connected to a plurality of transaction computers $30_{1-X}$ over a network 25. The enterprise transaction server 15 is a secure server and executes a secure transaction service that facilitates transactions between the transaction computers $30_{1-X}$ and external services. The external services may suitably include services provided by financial acquirers that accept credit card transactions and financial institutions that process debit transactions.

A secure server is a server computer physically located within a secure data center. A secure data center limits and controls physical and remote access to computers within the center. The computers within the secure data center are provided with network connections to one or more outside public or private networks so they can provide a service to customers. A secure computer may suitably execute software that performs financial transactions or processes valuable and/or sensitive information.

The enterprise provisioning server 20 is a secure server and executes enterprise provisioning software. The enterprise provisioning software maintains data about all the transaction computers $30_{1-X}$. The data includes unique information that identifies each of the transaction computers $30_{1-X}$ and includes a secure provisioning manifest (FIG. 2, element 250) that includes information identifying peripherals that are authorized to be attached to each of the transaction computers $30_{1-X}$. The enterprise provisioning server 20 also receives status information from each of the transaction computers $30_{1-X}$. The status information may suitably include alert information when an unauthorized peripheral is determined to be attached to one of the transaction computers $30_{1-X}$.

The transaction computers $30_{1-X}$ are coupled to the remote enterprise transaction server 15 and enterprise provisioning server 20 via the network 25. The network 25 may include a network which uses a communications protocol based on transmission control protocol/internet protocol (TCP/IP). The network 25 may include a combination of local area and wide area networks. The network 25 may further include any combination of wireless or wired networks. The network 25 may include a combination of private and public networks, including a global communication network, also known as the Internet. The term cloud based servers is sometimes used and refers to remote computer servers accessed over a public network, such as the Internet.

The transaction computers $30_{1-X}$ may suitably be located within a single location, for example in a single retail store, or they may be divided among many locations across a large geographic area. For example, the transaction computers $30_{1-X}$ may be divided among multiple stores owned by a retail company where the stores are located around the world. The transaction computers $30_{1-X}$ include multiple different types of computers. One example embodiment of the transaction computers $30_{1-X}$ includes a computer configured as a self-service point-of-sale (POS) transaction terminal used to process customer purchase transactions where a customer operates the terminal. Another example embodiment of the transaction computers $30_{1-X}$ includes a computer configured as an assisted point-of-sale (POS) transaction terminal used to process customer purchase transactions where an employee operates the terminal. Other example transaction computers and environments are also envisioned.

Turning now to FIG. 2A, there is provided an example embodiment of a transaction computer 30 that may suitably be used as one of the transaction computers $30_{1-X}$. The transaction computer 30 includes a motherboard 200, a display 280 and a plurality of peripherals 260 that may suitably be attached to and controlled by the transaction computer 30. The motherboard 200 includes a processor 205, a memory 210, a bus controller 265, a network controller 240, a universal serial bus (USB) controller 275 and a secure processing module 255. The processor 205 communicates with the memory 210 which includes computer instructions that implement an operating system 215 and computer instructions that implement transaction software 220. The processor 205 executes the computer instructions in the memory 210. The processor 205 creates a standard processing environment wherein computer instructions stored in the memory 210 are executed. While the processor 205 and other processors that are described herein are depicted and referred to as a single processor, multiple processors and processors with multiple processor cores are envisioned and within the scope and definition of this invention.

The memory 210 uses non-transitory storage devices including both volatile and non-volatile memory. The non-volatile memory may suitably include flash memory, other types of solid state electronic memory and rotating storage devices, such as disk drives or the like. Non-volatile memory retains stored information after power if removed from the memory until power is restored. Computer instructions stored in the memory 210 are executed by the processor 205 and cause the processor 205 to control the devices and peripherals attached to the transaction computer 30 and to provide the services and functions performed by the operating system 215 and the transaction software 220. The operating system 215 may suitably include a Microsoft, Linux, Apple, or other operating system. The transaction software 220 displays transaction screens on the display 280 for guiding an operator through a transaction and receives operator inputs and selections during the transaction. The transaction software 220 may also process a payment for the transaction by sending transaction information to a third party for processing. In some embodiments, the transaction software 220 relies on other software to process the transaction and provide an acknowledgement once payment has been made.

The transaction computer 30 further includes graphics circuitry for providing display screens to the display 280. The display 280 may suitably include a flat panel LCD display and it may also include a touch screen device that senses where the screen is touched. The bus controller 265 provides a high speed computer bus 270 that allows the processor 205 to communicate with the components on the motherboard 200. The network controller 240 provides the hardware and software needed to connect to and support communications with the network 25. The operating system 215 includes driver software that interfaces with the network controller 240 that provides a network stack that supports the network 25. The peripherals 260 are connected to the transaction computer 30 over a universal serial bus (USB) 265 controlled by the USB controller 275. In some embodiments, one or more of the peripherals 260 may communicate over other connections such as serial RS-232, serial RS-485, Firewire, or other circuitry for connecting peripherals. The operating system 215 may establish basic communications with some or all of peripherals 260 connected to the transaction computer 30 at a driver level. An application program interface (API) is provided that uses the driver level connection to each of the peripherals 260. The secure processing module 255 has access to the API to communicate with the peripherals 260.

The secure processing module 255 provides a secure processing environment separate from the standard processing environment provided by the processor 205 executing the computer instructions stored in the memory 210. The secure processing module 255 and the processor 205 can communicate with each other over a computer bus 270. However, the processor 205 does not have access to or control over elements within the secure processing environment provided by the secure processing module 255. More details of the secure processing module 255 are provided below.

In other example embodiments, the security processing module 255 may be external to the transaction computer 30. For example, the security processing module 255 may be incorporated into its own separately housed component for retrofitting existing computers without built-in capability or into a peripheral, either of which may be connected to the transaction computer 30 through peripheral connection circuitry. In another example, the secure processing module 255 may be implemented in a separate secure computer that controls a number of peripherals at different locations, for example, a single secure computer would suitably control the card reader at each gas pump of a gas station and a different transaction computer would process the purchase transaction while communicating with the secure computer.

The secure processing module 255 may be implemented using hardware logic, software instructions, or a combination of both. The secure processing module 255 has a secure processing environment that is separate from the standard processing environment of the motherboard 200 that is created by the processor 205. In some embodiments, both the secure processing environment and the standard processing environment are created by one processor that is running virtual machine software that separates the two environments.

The secure processing module 255 protects customer information received from one or more of the peripherals 260 by establishing an encrypted secure session with each peripheral 260. For example, the secure I/O module 230 may communicate with the card reader peripheral 40 via standard protocols and/or proprietary protocols via the USB controller 275. Once the card reader peripheral 40 is authenticated, the secure I/O module 230 establishes an encrypted secure session with the card reader peripheral 40. The card reader peripheral 40 then encrypts all data it sends to the secure I/O module 230. The secure I/O module 230 decrypts and provides the data received from the card reader peripheral 40 to the operating system 215 which provides it to the transaction software 220. The secure I/O module 230 also encrypts any data it sends to the card reader peripheral 40. No cryptographic key data is transferred between the secure I/O module 230 and the peripheral during the process of establishing the secure session. Cryptographic keys need not be communicated because the secure provisioning manifest 250 includes all cryptographic key data needed by the secure I/O module 230 to encrypt and decrypt data communicated between the peripheral and the secure I/O module 230.

The secure I/O module 230 preferably controls the flow of encrypted data from the peripherals 260 independently of the operating system 215, with the operating system 215 only establishing a connection with the peripherals 260 at a driver level. It should also be noted that once the secure session is established with one of the peripherals 260, the data received and transmitted by the driver level connection is encrypted and the operating system 215 cannot decrypt or encrypt the data. Only the secure I/O module 230 can decrypt or encrypt the data.

The secure I/O module 230 is invisible to operating system 215. That is, the operating system 215 has no driver or control over the secure I/O module 230 and no control over the encrypted secure sessions between the secure I/O module 230 and the peripherals 260. In the case where the Intel Core vPro™ brand processor is used for the processor 205, the operating system 215 has no driver or other control of the portion of the processor 205 that performs the functions of the secure I/O module 230. This arrangement minimizes the chance of a fraudster gaining access to the encryption keys stored in the secure processing module 255 through the operating system 215.

The operating system 215 uses the network controller 240 on the motherboard 200 to communicate over the network 25. In some embodiments, software executing in the secure processing module 255 uses a software interface to the operating system 215 to send and receive information over the network 25. In other embodiments, the secure processing module 255 includes separate network hardware and software, not available to the operating system 215, to communicate with remote computers (such as, the enterprise transaction server 15 and the enterprise provisioning server 20, for example) either over the network 25 or over a different network. In still other embodiments, the secure processing module 255 uses both the interface to the operating system 215 and the separate network hardware and software to communicate with the remote computers.

The secure I/O module 230 controls encrypted secure sessions with the peripherals attached to the transaction computer 30 that are able to support encrypted sessions. The peripherals include the display 280 and one or more of peripherals 260 depicted in FIG. 2B. The secure I/O module 230 polls all attached peripherals upon power up to obtain information that uniquely identifies the peripheral. The information includes the vendor's model, product identification and serial number of the peripheral. The secure I/O module 230 uses the secure provisioning manifest 250 to determine if the secure I/O module 230 is authorized to communicate with each peripheral. The secure provisioning manifest 250 includes peripheral information for each peripheral the secure I/O module 16 is authorized to communicate with. If the unique information from the peripheral matches corresponding information in the secure provisioning manifest 250 then, the secure I/O module 230 queries the peripheral to determine if it can communicate via an encrypted data link. If the peripheral can communicate via an encrypted data link, then the secure I/O module 230 issues a specific test message to the peripheral, to which the secure I/O module 230 expects a certain encrypted response. If the response matches what is expected, then the secure I/O module 230 establishes an encrypted secure session with the peripheral. The secure I/O module 230 occasionally tests the unique information of the peripheral to ensure a substitute peripheral has not somehow been substituted.

The security processing module 255 further includes a security module 235. The security module 235 includes software that implements additional features and functions used to process transactions. These functions include communicating with the enterprise transaction server 15 to process a transaction using information acquired from one or more of the peripherals 260 over an encrypted secure session. The security module 235 also stores encryption keys, which may include communication or session keys, financial provider keys, and retail provider keys.

Figure 2B:
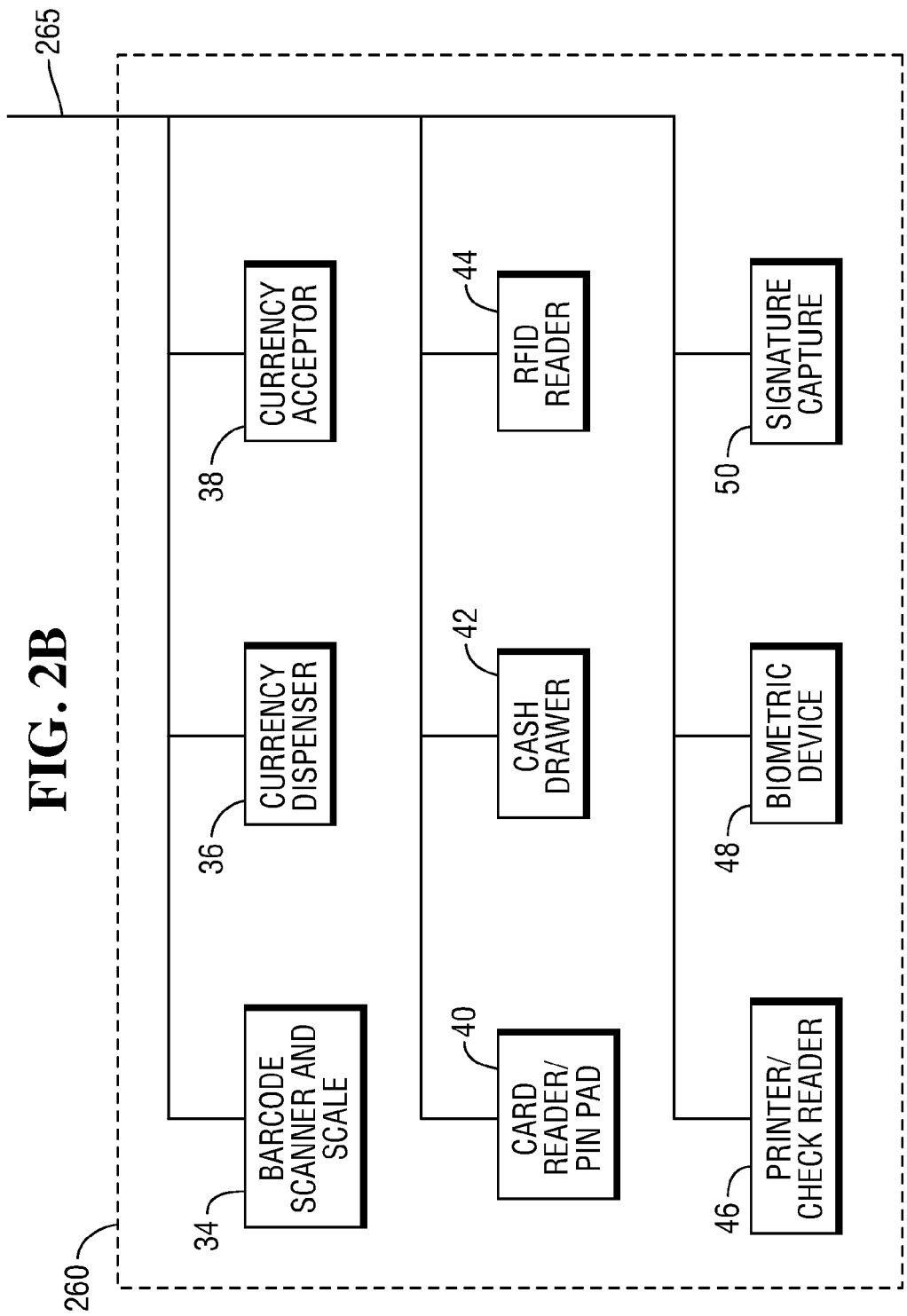
FIG. 2B is a high-level block diagram illustrating selected peripherals attached to the transaction computer of FIG. 2A.

Turning now to FIG. 2B, there is provided a high-level block diagram illustrating selected peripherals 260 that may be attached to the transaction computer 30. The peripherals 260 communicate with the transaction computer 30 using a USB connection or other suitable forms of computer communications. The peripherals 260 depicted in FIG. 2B are not meant to be an exhaustive list nor is it meant to imply that all of the peripherals 260 depicted must be present in every embodiment of the transaction computer 30 used in the transaction system 10. The peripherals 260 include a barcode scanner and scale 34, a currency dispenser 36, a currency acceptor 38, a card reader/pin pad 40, a cash drawer 42, a radio frequency identification (RFID) reader 44, a printer/check reader 46, a biometric device and a signature capture device 50. In some embodiments, the barcode scanner (also known as an optical code scanner) and scale 34 includes a laser based and an image based scanner for reading optical codes. Some embodiments just use an image based scanner.

Figure 3:
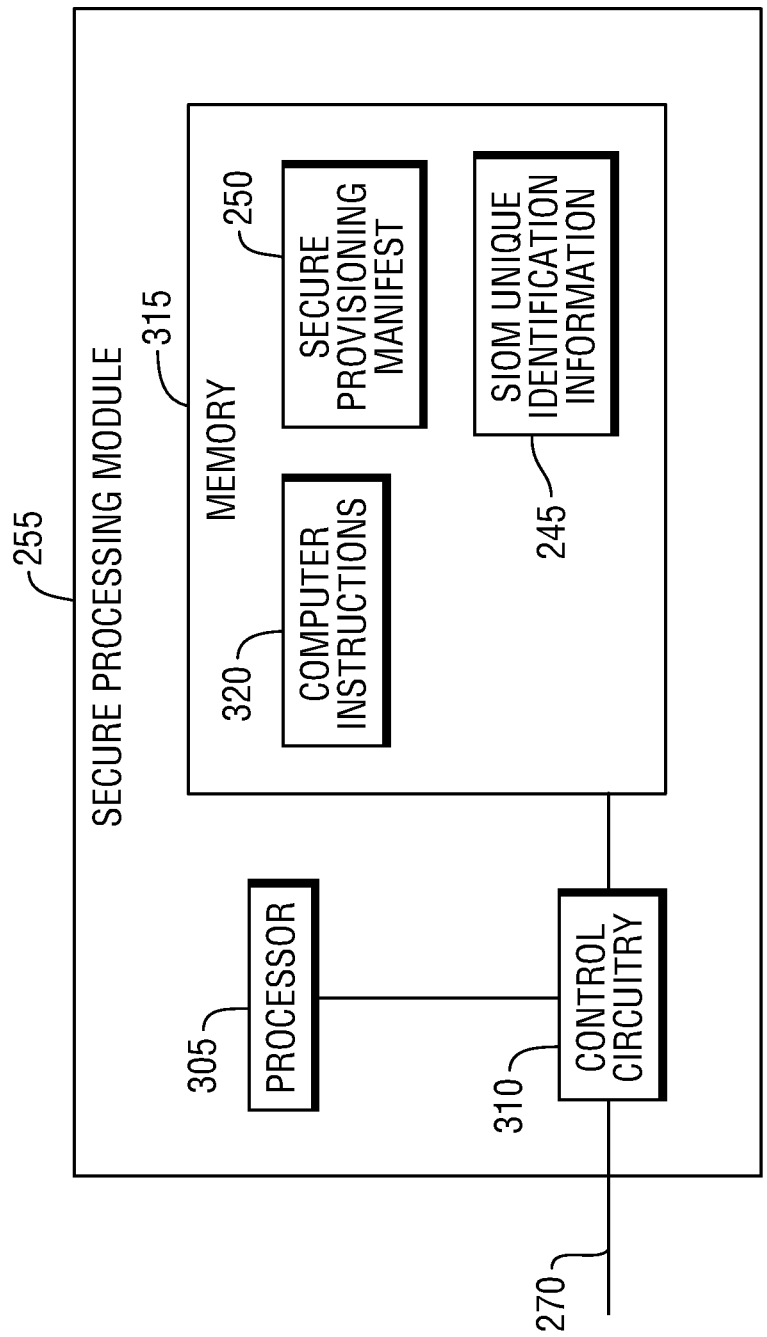
FIG. 3 is a high-level block diagram illustrating selected hardware and software components of a secure processing module.

With reference to FIG. 3, there is provided a high-level block diagram illustrating selected hardware and software components of the secure processing module 255. The secure processing module 255 includes a processor 305, a memory 315 and control circuitry 310. Stored within the memory 315 are computer instructions 320, the secure provisioning manifest 250 and information 245 that uniquely identifies the secure I/O module 230. When the processor 305 executes the computer instructions 320, the computer instructions 320 cause the processor 305 to implement the features and functions performed by the secure I/O module 230 and the security module 235.

The memory 315 is comprised of non-transitory storage devices including both volatile and non-volatile memory. The non-volatile memory may include flash memory and other types of solid state electronic memory that are non-volatile. The processor 305 may include a processor that has multiple processor cores or may be comprised of multiple processors.

The memory 315 further includes the unique identification information 245 for the secure I/O module 230. The unique identification information 245 includes a unique identifier for the secure I/O module 230 and a private cryptographic key (private key) associated with the secure I/O module 230. The private key has a unique public key associated with it. The public key is stored in the enterprise provisioning server 20 and used to encrypt data sent to the secure I/O module 230. The secure I/O module 230 uses its private key to decrypt the data encrypted with its public key. Only the private key can decrypt data encrypted with the public key and only the public key can decrypt data encrypted with the private key.

The computer instructions 320 and the unique identification information 245 are injected or stored in the memory 315 during the process of manufacturing the secure processing module 255. The secure provisioning manifest 230 is stored in the memory 315 and is encrypted using the secure I/O module's 230 public key. The secure provisioning manifest 250 can be updated at anytime for any of a number of reasons. The enterprise provisioning server 20 generates a new version of the secure provisioning manifest 250 as needed using the unique public key for the secure I/O module 230.

For example, when a customer service technician replaces a failed peripheral in a transaction computer 30, the technician communicates information identifying the removed peripheral and information uniquely identifying a replacement peripheral to the enterprise provisioning server 20. The enterprise provisioning server 20 then generates an update secure provisioning manifest 250 for the transaction computer 30 using the public key for the secure I/O module 230 known to be present in that transaction computer 30. The updated secure provisioning manifest 250 is then transmitted to the transaction computer 30 over the network 25. The secure I/O module 230 receives the updated secure provisioning manifest 250 and stores it in the memory 315 replacing the prior version.

The control circuitry 310 allows the processor 305 to communicate with the computer bus 270. This allows the processor 305 to perform a number of software functions and hardware functions that interface with software executed by the processor 205. For example, the processor 305 can generate a logical peripheral interface that simulates a driver interface to one of the peripherals 260. The processor 205 accesses the logical peripheral interface instead of the physical peripheral interface. The processor 305 has access to the physical peripheral using the computer bus 270. In some embodiments, substituting the logical peripheral interface for the physical peripheral interface is transparent to the software being executed by the processor 205. This allows for the use of legacy software that does not need to be updated. In some embodiments, an application program interface (API) is used by software executed by the processor 205 to communicate with the peripherals 260. For certain peripherals, the API communicates over the computer bus 270 with the control circuitry 310 instead of communicating directly with the peripheral. The computer instructions 320 executed by the processor 305 receive and implement the communication requests.

In one embodiment, the secure processing module 255 is a hardware module installed on the motherboard 200. In some embodiments, the secure processing module 255 is preferably tamper resistant to prevent access to the cryptographic keys stored in the memory 315. Tamper resistance may include one or more of electrical and mechanical safeguards to prevent physical tampering with the secure processing module 255. For example, the secure processing module 255 may include electrical circuits and switches that detect opening of the enclosure of the transaction computer 30, physical intrusion into the secure processing module 255 or an enclosure around the secure processing module 255, and that erase the cryptographic keys and optionally the software stored in the memory 315, thereby disabling the secure processing module 255.

In one embodiment, the secure processing module 255 includes a processor 305, a memory 315 and control circuitry 310. Computer instructions 320 and data including information uniquely identifying the secure I/O module and a secure provisioning manifest are preloaded in the memory before the secure processing module 255 is mounted on the motherboard 200 or the computer instructions and the data are loaded into the secure processing module 255 after it is mounted on the motherboard 200 but prior to being shipped to a customer in the terminal computer 30.

The secure processing module 255 includes the security module 235 and the secure I/O module 230. Both of these modules may suitably be implemented in hardware or software or a combination of both.

Figure 4A:
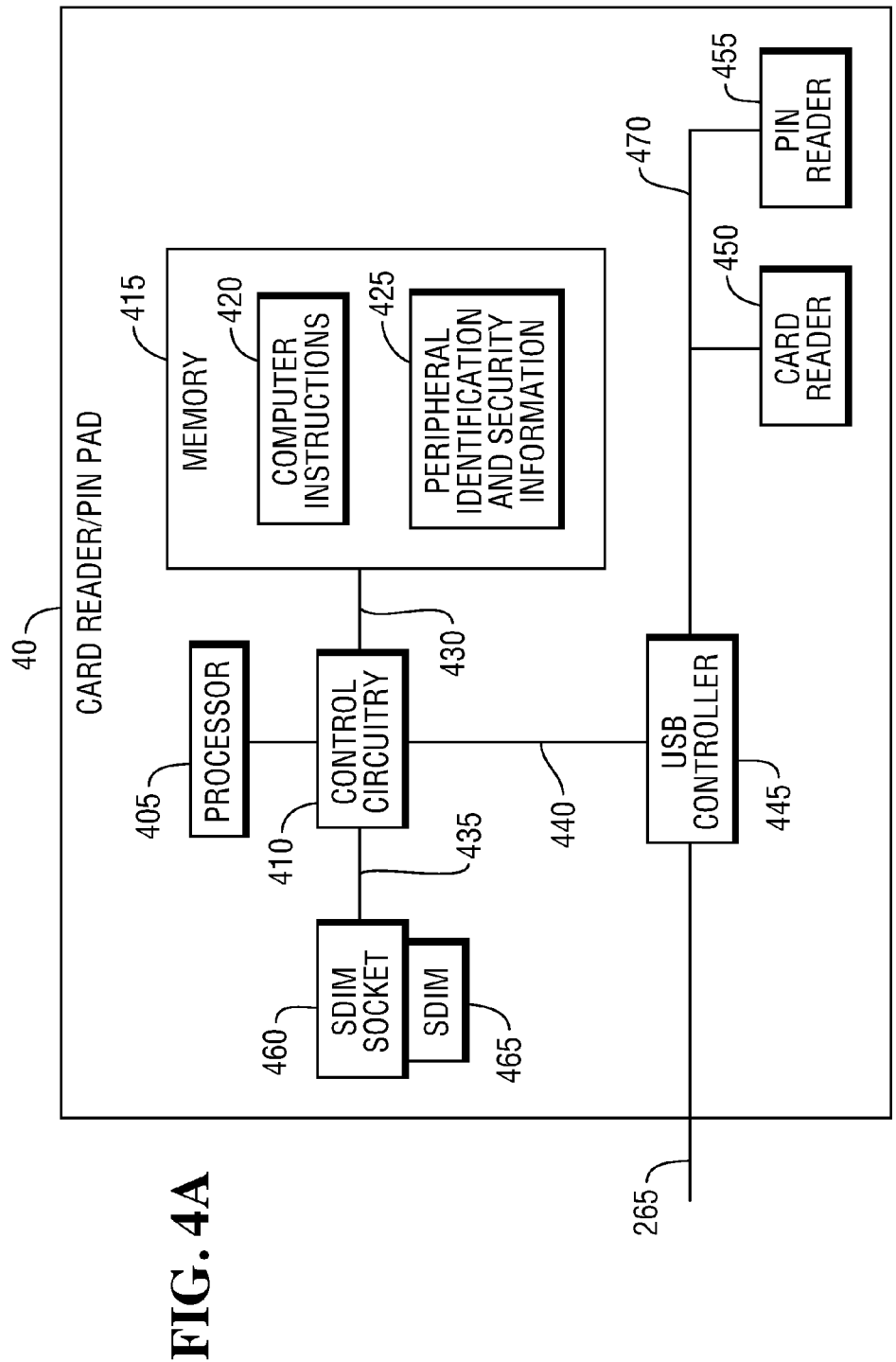
FIG. 4A is a high-level block diagram illustrating selected hardware and software components of a card reader/PIN pad peripheral.

Turning now to FIG. 4A, there is provided a high-level block diagram illustrating one example of the card reader/pin pad input peripheral 40. The card reader/pin input peripheral 40 is one of a plurality of different peripherals (see FIG. 2B) that can be attached to a transaction computer 30. The card reader/pin pad input (card reader) peripheral 40 includes a processor 405, a memory 415, an SDIM socket 460, control circuitry 410, a USB controller 445, a card reader device 450 and a pin reader input device 455.

The control circuitry 410 is depicted as a single block but may suitably be embodied as an amalgamation of control circuitry that provides interfaces: between the processor 405 and the memory 415 over a memory bus 430; between the processor 405 and a secure device identity module (SDIM) 465 plugged into the SDIM socket 460; and between the processor 405 and the USB controller 445. The interface between the processor 405 and the memory 415 allows the processor 405 to read and write information from any memory location within the memory 415. The processor 405 uses the interface to read and execute computer instructions 420 stored in the memory 415. The computer instructions 420 when executed by the processor 405 cause the processor 405 to implement the features and functions of the card reader peripheral 40 and control the devices and components of the card reader device 40.

In addition to the computer instructions 420, peripheral identification and security information 425 is also stored in the memory 415. The peripheral identification and security information 425 is stored in a non-volatile portion of the memory 415 during the manufacturing process for the card reader peripheral 40 or at some point before it is delivered for integration with the transaction computer 30. The peripheral identification and security information 425 includes information that uniquely identifies the card reader peripheral 40, such as a serial number, and the vendor that manufactured the card reader peripheral 40 plus a model number for the card reader peripheral 40 and cryptographic information unique to the card reader 40. The cryptographic information includes a private key that was generated as part of a public/private cryptographic key pair unique to the card reader peripheral 40 where the public key from the key pair is stored in the secure provisioning manifest 250 in a record that identifies the card reader peripheral 40.

The interface between the processor 405 and the SDIM 465 uses a computer bus 435 to interface and communicate with the SDIM 465. The interface allows the processor 405 to send requests and data to the SDIM 465 and to receive data from the SDIM 465. The SDIM socket 460 mechanically holds the SDIM 465 and communicates electrical signals between the SDIM 465 and computer bus 435. The SDIM 465 is removable and can be replaced as required. Changes or upgrades in the security protocols may necessitate replacing the current SDIM 465 with a new SDIM 465. The card reader peripheral 40 is housed within a housing (not shown). The SDIM 465 can only be replaced by opening the housing of the card reader peripheral 40. The housing of the card reader peripheral 40 is preferably sealed for security reasons as part of the manufacturing or deployment process. Therefore, the card reader peripheral 40 must be sent back to the manufacturer to have the SDIM 465 replaced. In some embodiments, field service personnel can open the card reader peripheral 40 in the field, replace the SDIM 465 and reseal the card reader peripheral 40. The field service personnel must use special equipment and processes to perform and register the replacement SDIM 465 or the card reader peripheral 40 fail configuration test and will not be useable.

In this embodiment, the physical parameters of the SDIM 465 are based on the standards that define a subscriber identity module (SIM) used in GSM cellular phones. The SDIM socket 460 is a mini-SIM socket that will accept an SDIM 465 that conforms to the physical and electrical parameters of a mini-SIM card. In other embodiments, other SIM card sizes are used such as the full-size, micro-SIM or nano-SIM. In still other embodiments, the physical parameters of the SDIM 465 and the SDIM socket 460 are based on other standards or a proprietary specification that defines a plug-in module that includes a processor and memory for securely storing information and computer instructions that are executed by the processor.

The interface between the processor 405 and the USB controller 445 uses a computer bus 440 to communicate with the USB controller 445. The USB controller 445 generates a first USB bus 265 and second USB bus 470. The first USB bus 265 connects the card reader peripheral 40 to the transaction computer 30. The second USB bus 470 is used to communicate with the card reader device 450 and the pin reader device 455. This embodiment uses the industry standard USB bus but other embodiments may suitably use different types of buses based on different standards and protocols.

The card reader device 450 includes a magnetic stripe reader that is configured to read information from a magnetic stripe included on cards. In some embodiments, the card reader device 450 communicates with a computer chip located within a card to read information. The card reader device 450 may use a radio frequency transceiver or mechanical contacts to communicate with the computer chip within the card. The information read from the card may suitably include financial information and/or customer information.

The card reader peripheral 40 includes a pin reader device 455 that includes a key pad used by a person to enter information. For financial transactions, the information may suitably be a PIN code which is used with the information read from the card. In some embodiments, the pin reader device 455 includes a display that displays information about a financial transaction, instructions to the person and information that has been entered on the key pad. In some embodiments, the display includes a touch screen feature that is used instead of a key pad to input information from the person using the pin reader device 455.

The SDIM 465 includes one or more secrets established by a third party. The third party is typically the destination for information being received by the card reader peripheral 40. For a credit card transaction, the third party would typically be an acquiring bank or company and the secrets are an extra level of security that the third party requires to insure the information from the card reader peripheral 40 is authentic and has not been tampered with. The secrets may suitably include a number of different features and functions.

Figure 4B:
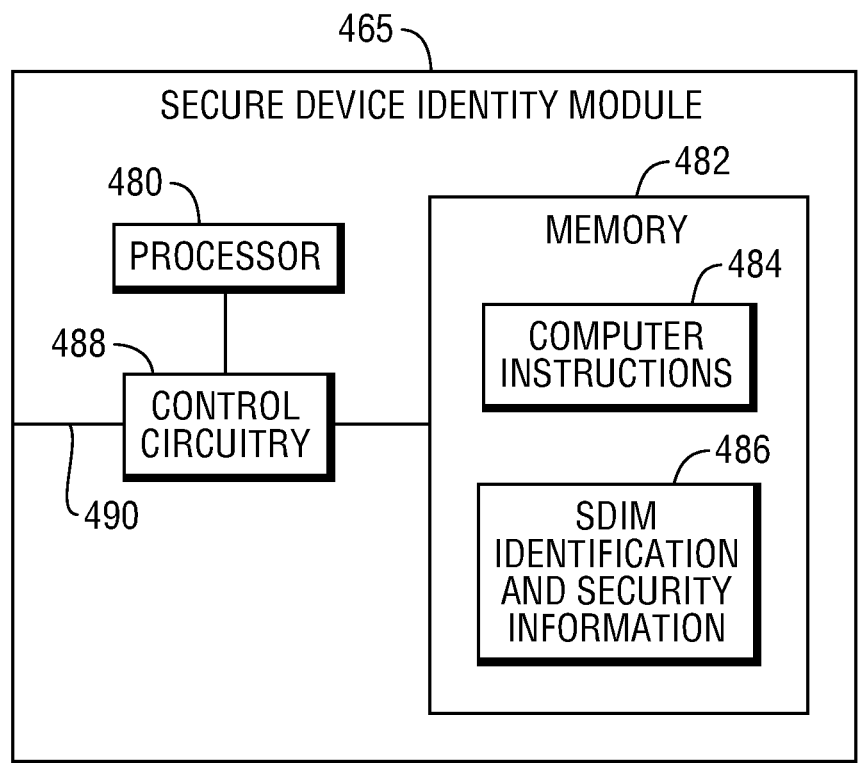
FIG. 4B is a high-level block diagram illustrating selected hardware and software components of a secure device identity module.

With reference to FIG. 4B, there is provided a high-level block diagram illustrating one embodiment of a secure device identity module (SDIM) 465. The SDIM 465 includes a processor 480, a memory 482 and control circuitry 488. It should be noted that the blocks represent logical computer functions and in some embodiments all of the depicted functional blocks are implemented in a single electronic package while in other embodiments, the depicted functional blocks are implemented using multiple electronic packages. The highest level of security is obtained when at least the processor 480 and memory 482 functions are integrated into a single electronic component or into a single electronic package. Integrating these functions increases security by increasing the effort and cost required to physically access and probe the electronic signals during operation of the SDIM 465.

The memory 482 includes both volatile or short term memory and non-volatile or long term memory. Volatile memory is computer memory that will retain the information stored in the memory while power is applied to the memory. Once power is removed, the stored contents of the memory will be lost after internal temporary electrical charges dissipate. Volatile memory includes dynamic random access memory (DRAM) and static random access memory (SRAM). Non-volatile memory is computer memory that retains the information stored in the memory after power to the memory is removed. When power is removed from a non-volatile memory, the contents of the memory are not lost and can be read when power is restored. Non-volatile memory can retain stored contents after power is removed for a period of time usually measured in years. The memory 482 uses non-volatile solid state memory.

The memory 482 includes computer instructions 484 and SDIM identification and security information 486. The computer instructions 484 include instructions that implement an operating system and instructions that implement at least one application. The processor 480 executes the computer instructions 484 which then cause the processor 480 to implement the features and functions of the SDIM 465. The control circuitry 488 provides an interface between the processor 480 and the memory 482 so the processor 480 can read and write information to the memory 482. In some embodiments, the control circuitry 488 has the ability to wipe the entire contents of the memory 482 clean on command from the processor 480 or if the control circuitry 488 detects an attempt to tamper with the SDIM 465. The SDIM 465 provides an external interface 490 that allows the SDIM 465 to physically and electrically connect to the card reader peripheral 40 using the SDIM socket 460. The control circuitry 488 supports the external interface 490 which allows the processor 480 to communicate with the processor 405 on the card reader peripheral 40.

One example method of manufacturing a SDIM 465 is to: manufacture an electronic substrate with the proper size and with the proper electronic signal paths; attach one or more computer components to the substrate; and then encapsulate the components for mechanical protection and to provide security. At this point, the SDIMs 465 are functional but the memory 482 has only been loaded with basic computer instructions 484 needed for testing the components of each SDIM 465. The operational computer instructions 484 and the SDIM identification and security information 486 must be loaded before a SDIM 465 can be installed in a peripheral such as the card reader peripheral 40. It is possible that the same manufacturer that assembled the SDIM 465 will also load the operational information and applications for a third party. However for security reasons, the assembled SDIMs 465 may be shipped to another manufacturer that the third party has contracted with to load the third party's operational information and applications into the memory 482 of each SDIM 465, No matter what method is used, the third party provides the operational information and applications to be loaded in the memory 482. Once the operational information and applications have been loaded into the memory 482 and tested, the SDIMs 465 are sent to a party that is performing the final assembly of the card reader peripheral 40 and/or the transaction computer 30 prior to being deployed to the end user. Each SDIM 465 is plugged into the proper card reader peripheral 40 and the card reader peripheral 40 is then sealed. In some embodiments, each SDIM 465 has information that identifies the card reader peripheral 40 that it should be installed in. Failure to properly match the particular SDIM 465 with the proper card reader peripheral 40 will result in a configuration error. In this example, the SDIM 465 is used with a card reader peripheral 40 but it should be understood that the SDIM 465 can be used with any peripheral that processes sensitive information such as a key board, optical code reader or a peripheral that uses near field communications to communicate with portable devices.

The operational information and applications comprise one or more secret functions that the third party requires to be used on financial transaction information processed by the card reader peripheral 40 when the SDIM 465 is installed in the card reader peripheral 40. In some embodiments, the third party secret functions include information read from the SDIM 465 by the card reader peripheral 40 and the third party requires that this information be included in financial transaction information processed by the card reader peripheral 40 or the information will not be authenticated and used by the third party.

In other embodiments, the third party secret functions include one or more cryptographic functions implemented by the SDIM 465. The cryptographic functions include encryption and hashing functions that are performed on data provided to the SDIM 465. For example, the third party may require that all PIN data be encrypted by the SDIM 465 before other cryptographic functions are performed on the data and it is transmitted externally by the card reader peripheral 40. In this case, the card reader peripheral 40 would then provide the PIN data to the SDIM 465 with a request to encrypt the data. The SDIM 465 would then encrypt the PIN data and returned the PIN data in encrypted form. In some embodiments, the SDIM 465 provides a hashing function where the SDIM 465 processes data provided to it by the card reader peripheral 40 to produce a hash value for the data. The data to be processed is defined by the third party and may include for example PIN and/or card data.

The SDIM identification and security information 486 includes information that identifies the SDIM 465 and the third party that provided the SDIM 465. The SDIM identification and security information 486 is securely stored in the memory 482. In some embodiments, the information 486 is stored in encrypted form and the key to decrypt the information 486 is encoded within the computer instructions 484. In other embodiments, the decryption key is stored in a secure area within the processor 480. The following list is an example of data that may be included in the identification and security information 486. The list is not meant to limit the information to just these items.

List 1—SDIM Identification and Security Information 486
1) A cryptographic key used for specific cryptographic functions. For example a seed key used to encrypt the PIN or card data. In addition, the computer instructions 484 may include an application that implements the cryptographic functions.

2) A bank identifier number (BIN) which can be polled to ensure a trusted device.

3) A BIN and a SDIM serial number which can be polled to identify the SDIM within the deployed "herd" of bank-owned devices.

4) A BIN and a peripheral serial number (for the peripheral the SDIM 465 is attached to) polled and matched against a polled peripheral serial number that is part of the peripheral identification and security information 425. This ensures that the proper configuration of the peripheral (card reader 40) and the SDIM 465.

5) A security certificate indicator.

The following example provides one illustration of how a secret cryptographic function is implemented by the SDIM 465 and used by the card reader peripheral 40. In this example a financial transaction is processed using a credit or debit card. The third party is an acquiring bank or company that will accept the credit or debit card data and process the financial transaction to transfer money. The secret cryptographic function is an extra level of security that the third party requires to insure the information received from the card reader peripheral 40 can be authenticated and that the information has not been altered or compromised since the information left the control of the card reader peripheral 40. In this example, the card reader peripheral 40 is attached to the transaction computer 30 which is performing the function of a point of sale terminal processing a purchase transaction for a user. The SDIM 465 may include multiple secret cryptographic functions. In this example, the required secret cryptographic function performs an encryption function on the PIN and card data inputted by the card reader peripheral 40 from the user and the third party requires that PIN and card data be encrypted by the secret cryptographic function provided by the SDIM 465 before the data is transmitted from the card reader peripheral 40.

The card reader peripheral 40 implements the secret encryption function by sending the PIN and card data inputted from the user to the SDIM 465 with a request that the data be processed by the secret cryptographic function. The SDIM 465, using the onboard processor 480 and computer instructions 484, encrypts the data using cryptographic keys 486 stored securely in the memory 482 of the SDIM 465 and returns the encrypted data back to the card reader peripheral 40. The card reader peripheral 40 then creates a card data record that includes the encrypted PIN and card data plus other information about the peripheral and the transaction. The card reader peripheral 40 then encrypts the card data record using the unique private key 425 of the card reader peripheral 40 and transmits the encrypted card data record to the transaction computer 30 using the secure encrypted session. The transaction computer 30 receives and decrypts the card data record using the public key of the card reader peripheral 40 (found in the secure provisioning manifest 250). However, the transaction computer 30 cannot decrypt the PIN and card data since it does not have the information required to decrypt that data. Only the third party has this data. The encrypted PIN and card data is eventually received by the third party as part of the financial transaction. The third party uses information that identifies the SDIM 465 that encrypted the PIN and card data to identify a key held only by the third party and then uses the identified key to decrypt the PIN and card data. The third party also performs an authentication process on the PIN and card data and the SDIM 465 and card reader peripheral 40 used. If the authentication process is successful, a financial transaction based on the PIN and card data is performed.

In this example, the secret cryptographic function is an encryption function and the PIN and card data is encrypted by the SDIM 465 and cannot be used by the transaction computer 30. The transaction computer 30 can pass the data to the third party to decrypt and use the data but the transaction computer 30 cannot use the data. In other embodiments, the secret cryptographic function is a hashing function that provides a hash value for the PIN and card data but the PIN and card data is stored in clear text form in the card data record. This allows the transaction computer 30 use the PIN and card data. For example, the transaction computer 30 may have a loyalty program that uses the card data to identify the user and track the items purchased by the user.

The above example illustrates one possible implementation of a secret stored in the SDIM 465 and used by the card reader peripheral 40. Other secrets are envisioned such as a secret function that generates a unique identification for each card data record. The card reader peripheral 40 sends the SDIM 465 the PIN and card data and requests a new unique identification. The SDIM 465 generates a unique identification that includes information about the PIN and card data and uses information securely stored in the SDIM 465. The unique identification and the PIN and card data are included in the card data record and sent to the third party. The third party uses the unique identification to authenticate the PIN and card data. The information about the PIN and card data included in the unique identification is also used to determine if the PIN and card data has been altered. In some embodiments, the information about the PIN and card data includes a cyclic redundancy check (CRC) code for the PIN and card data. In still other embodiments, the information about the PIN and card data includes a hash code calculated using the PIN and card data.

With reference to FIG. 5, there is provided a high-level diagram illustrating an example of the secure provisioning manifest 250. The secure provisioning manifest 250 is delivered to and stored in the secure processing module 255 encrypted using the public key associated with the secure I/O module 230. When data from the secure provisioning manifest 250 is required, the secure I/O module 230 decrypts it using the private key 245 associated with the secure I/O module 230 and stored in the memory 315. A successful decryption of the secure provisioning manifest 250 also authenticates the secure provisioning manifest 250.

The information depicted in this embodiment of the secure provisioning manifest 250 is not meant to be limiting or all inclusive. In this example embodiment, the secure provisioning manifest 250 is divided into a first section 505 and second section 510. The first section 505 includes 12 records numbered 1-12. Other embodiments will include a different number of records. Record 1 includes information that identifies the secure transaction service and the secure enterprise transaction server 15 used to process financial transactions for the transaction computer 30. Record 2 includes information that uniquely identifies the secure I/O module 230 installed on the transaction computer 30. Record 3 includes information that identifies an issue date for the secure provisioning manifest 250. Record 4 includes information that identifies an expiration date for the secure provisioning manifest 250. When this date is reached or just prior to the date, the secure I/O module 230 requests a new secure provisioning manifest 250 from the enterprise provisioning server 20. Record 5 includes information that identifies a grace period for the secure provisioning manifest 250 which defines a period of time (if any) an expired secure provisioning manifest 250 may be used after its expiration date.

Records 6-12 are policy records. The secure provisioning manifest 250 may include any number of policy records. This embodiment includes 7 policy records. A policy record includes a policy rule that defines how a resource is used. Each policy record is associated with a peripheral or a resource of the transaction computer 30. There can be multiple policy records for each peripheral or resource. For example, the barcode scanner 34 can read 1D barcodes and 2D barcodes. 1D barcodes are typically used to identify items presented for purchase while certain 2D barcodes may in addition be used to encode sensitive information on identification documents. Therefore, a first policy record associated with the barcode scanner peripheral 34 could have a rule requiring that data read from 1D barcodes be returned to the operating system 215 as decrypted clear text. A second policy record also associated with the barcode scanner peripheral 34, has a rule requiring that data read from 2D barcodes is returned to the operating system 215 as encrypted text to protect the data. The secure I/O module 230 decrypts the data and retains a decrypted version of the data and uses it to process a financial transaction, if needed. However, the applications executing by the processor 205 of the transaction computer 30 can not decrypt the data and can only process the data sent in clear text form.

Records 6 and 7 are policy records associated with the PIN or pin pad component of the magnetic stripe reader peripheral 40. Record 8 is a policy record associated with the secure transaction service running on the enterprise transaction server 15. The rule can define which transactions are sent to the secure transaction service for processing and which transactions are sent to the operating system 215 for legacy processing by the transaction software 220. Record 9 is a policy record associated with the barcode scanner 34. Record 10 is a policy record associated with the magnetic stripe reader peripheral 40. Record 11 is a policy record associated with the near field communications peripheral with is included in the RFID reader 44. Record 12 is a policy record associated with the network controller 240 function of the motherboard 200. This record would include a rule on using the network controller 240 to communicate with external computers.

Certain legacy peripherals can not support encrypted secure sessions so policy records are set up for these peripherals that state the peripheral can not support encrypted sessions so do not attempt to establish a secure session.

The second section 510 of the secure provisioning manifest 250 includes a list of peripherals that are authorized to be connected to the transaction computer 30. Any peripheral attached to the transaction computer 30 that is not listed in this section of the secure provisioning manifest 250 is not authorized to be attached to the transaction computer 30 and the secure I/O module 230 will not communicate with it. The operating system 215 may still be able to communicate with the peripheral in some situations. However, the secure I/O module 230 will not communicate with the peripheral and will send an alert or error report to the enterprise provisioning server 20 listing any acquired information about the unauthorized peripheral. A policy record can be included with a rule that determines what action the secure I/O module 230 should take when an unauthorized peripheral is found. The rule may cause the secure I/O module 230 to shut down the transaction computer 30 or it may allow normal operations of the peripheral if it is considered a legacy peripheral.

The second section 510, as depicted in this example, has information on five peripherals. The record for each peripheral includes information 515 unique to each peripheral. The information 515 includes an item identification, a public key associated with the peripheral, a vendor identification, a vendor product identification, a vendor serial number and a reference to the policy records that should be applied to this peripheral. The public key is a cryptographic key associated with a private key where both keys are associated with the peripheral. The private key is stored in the peripheral. The secure I/O module 230 uses the public key to encrypt and decrypt secure data sent to and received from the peripheral over a secure session with the peripheral.

In some embodiments, the vendor serial number may include a range of serial numbers instead of a single serial number. When a range is specified, a peripheral will be authenticated if the serial number for the peripheral falls within the specified range. Using a range of serial numbers allows a customer that operates a number of transaction computers 30 to replace a peripheral in one transaction computer with a similar model peripheral from another transaction computer without having to call and wait for a customer service person to arrive and perform a peripheral update. A customer would want to do this if a peripheral failed.

The peripheral's public key and private key form a unique public/private key pair that has been generated and associated with the peripheral. In some embodiments, the key pair is generated and the private key is injected or stored in the peripheral's long term memory at some point during the process of manufacturing the peripheral. The public key is provided with the peripheral but not stored in the memory of the peripheral. When the peripheral is registered with the transaction system 10, information about the peripheral including the vendor's model number, the vendor's serial number, the vendor's product identification and the public key are sent to the enterprise provisioning server 20 and stored in a database of registered peripherals.

After the peripheral has been registered, the peripheral is attached to the transaction computer 30 either during the manufacture of the transaction computer 30 or during a field upgrade or replacement process performed on the transaction computer 30. An authorized person then identifies the peripheral and the transaction computer 30 to the enterprise provisioning server 20 and informs the enterprise provisioning server 20 that the peripheral has been attached to the transaction computer 30. The enterprise provisioning server 20 then retrieves information about the peripheral from the database of registered peripherals and retrieves a copy of the current secure provisioning manifest 250 for the transaction computer 30 from a database of registered transaction computers. The enterprise provisioning server 20 adds a new record to the second section 510 of the retrieved version of the secure provisioning manifest 250 for the transaction computer 30 and further adds a policy record if needed. The new record includes the information from the peripheral database that uniquely identifies the peripheral. The updated version of the secure provisioning manifest 250 is then encrypted using the public key associated with the secure I/O module 230 and transmitted to the transaction computer 30. The enterprise provisioning server 20 replaces the old version of the secure provisioning manifest 250 stored in the database of registered transaction computers and associated with the transaction computer 30 with the updated version of the secure provisioning manifest 250. Once the secure I/O module 230 receives the updated secure provisioning manifest 250 and authenticates it, the secure I/O module 230 will recognize the newly attached peripheral and authorize communications with it.

Figure 6:
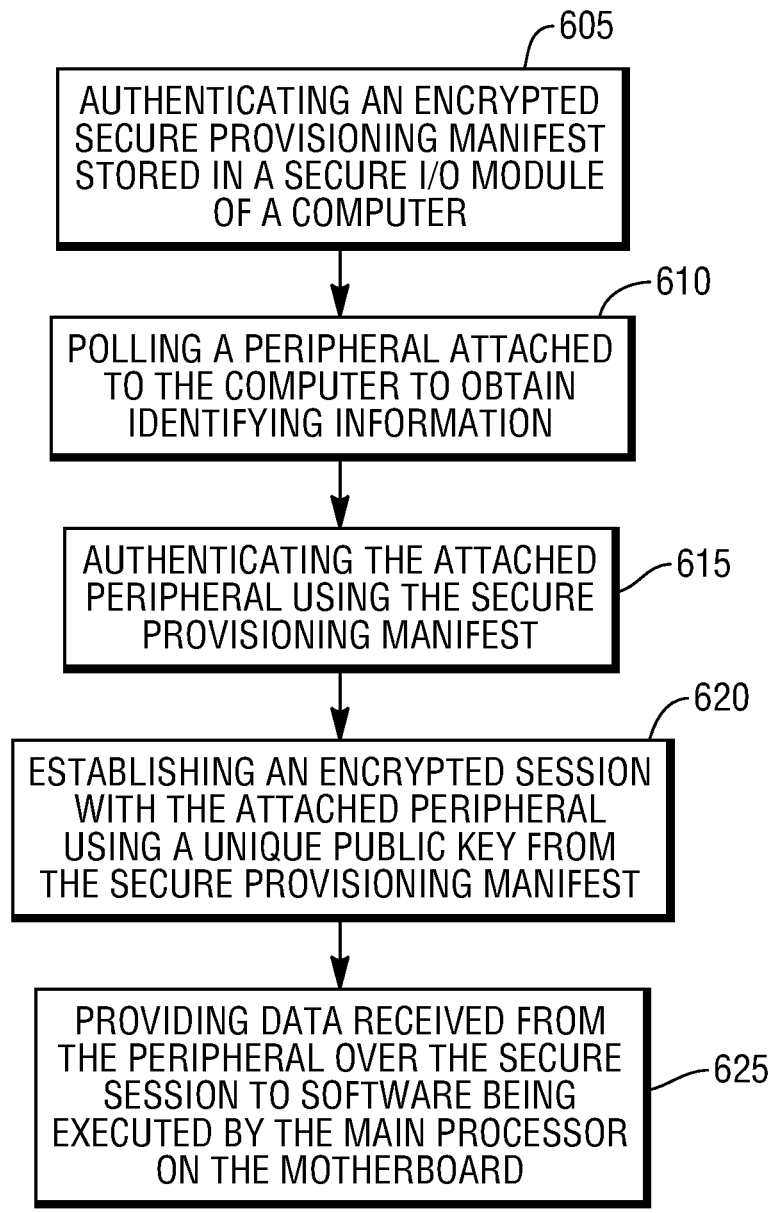
FIG. 6 is a high-level flow diagram illustrating a method of operating a secure I/O module using a secure provisioning manifest.

Turning to FIG. 6, there is provided a flow diagram illustrating a method of operating the secure I/O module 230 using the secure provisioning manifest 250 to authenticate and communicate with peripherals 260 attached to the transaction computer 30.

In step 605, the secure I/O module 230 authenticates the secure provisioning manifest 250 stored in the memory 315 of the secure processing module 255. The secure provisioning manifest 250 has been encrypted using the secure I/O module's 230 public key. Only the secure I/O module's 230 private key can successfully decrypt the encrypted secure provisioning manifest 250. The secure I/O module performs a decrypt operation on the encrypted secure provisioning manifest 250 using the private key 245 stored in the memory 315. The secure provisioning manifest 250 is authenticated if the decrypt operation successfully generates a proper clear text version of the secure provisioning manifest 250. The secure I/O module 230 can determine if the decrypt operation was successful by calculating a checksum for the decrypted version secure provisioning manifest 250 and comparing it to a checksum stored in the secure provisioning manifest 250. If they match, the decrypt operation was successful. If the decrypt operation is not successful, the secure I/O module 230 transmits an error report to the enterprise provisioning server 20. In some embodiments, the secure I/O module 230 will also stop the transaction computer 30 from performing any transactions until a new secure provisioning manifest 250 is received and authenticated.

In step 610, the secure I/O module 230 polls a peripheral attached to the transaction computer 30 and obtains information that uniquely identifies the peripheral. The information includes a vendor identification, a vendor product identification and a vendor serial number for the peripheral.

In step 615, the secure I/O module 230 compares the information received from the polled peripheral with peripheral information stored in the secure provisioning manifest 250. If there is a match, the peripheral is authenticated. If no match is found, the peripheral is not authenticated and the secure I/O module 230 will not communicate with the peripheral and will not establish a secure session with the peripheral. The secure I/O module 230 also transmits an error report to the enterprise provisioning server 20 identifying the peripheral, the fact that it was not authenticated and other information identifying the secure I/O module 230 and the transaction computer 30. If the peripheral is a legacy peripheral, the transaction computer 30 may still communicate with the peripheral using legacy processes.

In step 620, the secure I/O module 230 establishes an encrypted secure session with the attached peripheral if the peripheral was authenticated. The secure I/O module 230 uses the public key for the authenticated peripheral stored in the secure provisioning manifest 250 to encrypt data sent to the peripheral and to decrypt data received from the peripheral.

In step 625, the secure I/O module 230 provides data, received from the peripheral using the secure session, to the software executed by the processor 205, the main processor on the motherboard 200, according to the policy rules included in the secure provisioning manifest for the peripheral. The policy rules may allow all data to be provided as clear text or the policy rules may restrict some or all the data from being provided to the software executed by the processor 205.

Figure 7:
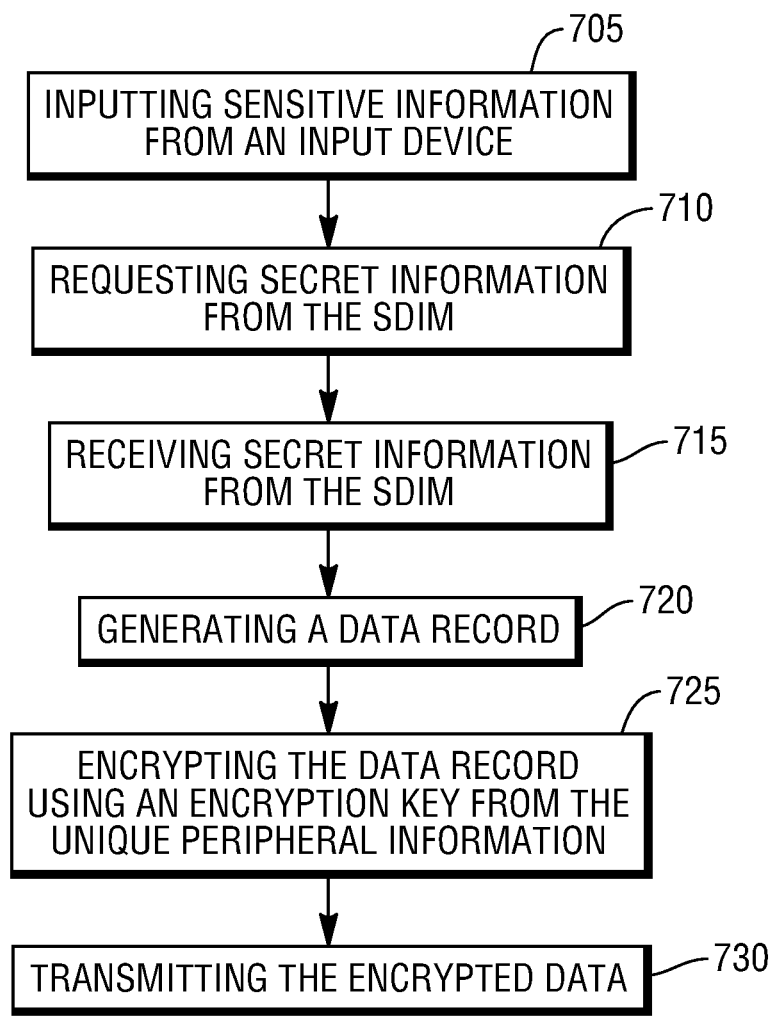
FIG. 7 is a high-level flow diagram illustrating a method of operating a card reader/PIN pad peripheral using a secure device identity module that provides secret information and functions.

FIG. 7 provides a high-level flow diagram illustrating a method of using installable secret functions in a peripheral. In this example method, the peripheral is the card reader peripheral 40 used to read financial information from a credit or debit card using the card reader 450 and to input a personal identification number (PIN) using the PIN reader keyboard 455.

In step 705, the processor 405 of the card reader peripheral 40 reads the sensitive information from the input device. The sensitive information includes the financial information and the input device is the card reader 450. If the financial information is from a debit card or other type of card that requires a PIN number, a PIN number is read from the PIN reader keyboard 455 and becomes part of the financial information.

In step 710, the processor 405 sends a request to the SDIM 465 for SDIM identification and security information 486 securely stored in the memory 482. The information 486 is also referenced as secret information because it is provided by the third party and used by the third party to authenticate the SDIM 465 and the transaction information processed by the card reader peripheral 40. In some embodiments, the information 486 is encrypted and the processor 480 decrypts the information 486 using information securely stored in the SDIM 465. In other embodiments, the information 486 is securely stored within the processor 480 so that only the processor can accept the information 486.

In step 715, the processor 405 receives the decrypted SDIM identification and security information 486 from the SDIM 465. The information 486 may include one or more of the data items described above in List 1, for example.

In step 720, the processor 405 generates a data record that includes the sensitive information, the SDIM identification and security information 486 and one or more items from the peripheral identification and security information 425.

In step 725, the processor 405 encrypts the generated data record using a private encryption key that is stored in the peripheral identification and security information 425. This process is dictated by the requirements of the secure encrypted session that has been established with the transaction computer 30.

In step 730, the processor 405 transmits the encrypted generated data record using the secure encrypted session to the transaction computer 30.

Figure 8:
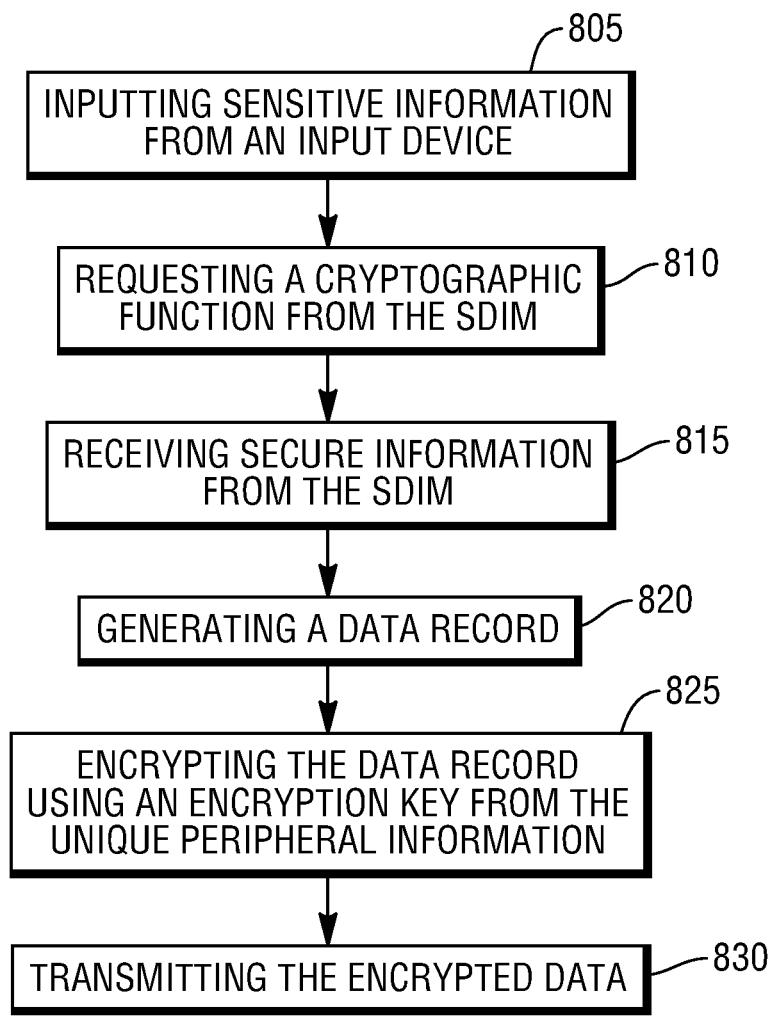
FIG. 8 is a high-level flow diagram illustrating a method of operating a card reader/PIN pad peripheral using a secure device identity module that provides a secret cryptographic function.

FIG. 8 provides a high-level flow diagram illustrating another method of using installable secret functions in a peripheral. In this example method, the peripheral is the card reader peripheral 40 used to read financial information from a credit or debit card using the card reader device 450 and to input a personal identification number (PIN) using the PIN reader keyboard 455.

In step 805, the processor 405 of the card reader peripheral 40 reads the sensitive information from the input device. The sensitive information includes the financial information and the input device is the card reader device 450. If the financial information is from a debit card or other type of card that requires a PIN number, a PIN number is read from the PIN reader keyboard 455 and becomes part of the financial information.

In step 810, the processor 405 sends a request to the SDIM 465 for the SDIM 465 to perform a cryptographic function on data that is included with the request. The processor 480 on the SDIM 465 performs the cryptographic function. In some embodiments, multiple cryptographic functions are available and can be requested. The cryptographic functions are included in the computer instructions 484 stored in the memory 482. In some embodiments, the cryptographic function is a cryptographic hashing function that processes the data included with the request and returns a hash value along with the included data in cleartext form. In other embodiments, the cryptographic function is an encryption function that encrypts the data included with the request and returns the data in ciphertext (encrypted) form. The cryptographic key used to encrypt the data is stored in the SDIM identification and security information 486. In some embodiments, only the third party has a corresponding cryptographic key that can decrypt the data. In this example, the data included with the request includes the sensitive information.

In step 815, the processor 405 receives the data returned from the SDIM 465 as a result of performing the cryptographic function.

In step 820, the processor 405 generates a data record that includes the data returned by the SDIM 465 after the cryptographic function is performed, the SDIM identification and security information 486, which was previously received from the SDIM 465 (see FIG. 7) and one or more items from the peripheral identification and security information 425.

In step 825, the processor 405 encrypts the generated data record using a private encryption key that is stored in the peripheral identification and security information 425. This process is dictated by the requirements of the secure encrypted session that has been established with the transaction computer 30.

In step 830, the processor 405 transmits the encrypted generated data record using the secure encrypted session to the transaction computer 30.

Although the present invention has been described with particular reference to certain preferred embodiments thereof, variations and modifications of the present invention can be effected within the spirit and scope of the following claims.

What is claimed is:

1. A pluggable secure device identity module that is adapted to plug into a peripheral before the peripheral is sealed and providing secret security features and functions to the peripheral, the module comprising:
   a memory including computer instructions and secure module identification and security information; and
   a processor configured for communicating with the memory through control circuitry of the pluggable secure device identity module, wherein when in response to the processor executing the computer instructions the processor implements the features and functions of the secure device identity module by:
      providing to the peripheral the secure module identification and security information when requested by a request from the peripheral; and
      providing to the peripheral the results of a secret cryptographic function performed on data provided in a second request from the peripheral to perform the function, wherein a peripheral processor of the peripheral only has direct bus communications with the control circuitry of the security identity module, wherein the peripheral processor does not have direct access to or control of the memory of the secure device identity module or the processor of the secure device identity module.

2. The module of claim 1, wherein the secret cryptographic function is an encryption function.

3. The module of claim 1, wherein the secret cryptographic function is a cryptographic hashing function.

4. The module of claim 1, wherein the security information includes a unique serial number for the secure device identity module and a unique serial number for the peripheral the secure device identity module is plugged into.

5. A peripheral comprising:
   a first input device configured for receiving sensitive information from a user;
   a pluggable secure device identity module (SDIM) plugged into an internal socket of the peripheral where the internal socket is not externally accessible, the SDIM configured for performing a secret function;
   a first memory configured for storing first computer instructions and unique peripheral information;
   a first processor configured for communicating with the input device, the SDIM and the first memory, wherein the first computer instructions when executed by the first processor cause the first processor to perform the following:
      inputting sensitive information from the input device;
      receiving from the SDIM secret information where the secret information includes identification and security information;
      generating a data record including the inputted sensitive information and the received SDIM identification and security information;
      encrypting the data record using an encryption key from the unique peripheral information; and
      transmitting the encrypted data record, and wherein the first processor only has bus communications with the SDIM through control circuitry of the SDIM and the first processor does not have direct access to or control of other elements of the SDIM.

6. The peripheral of claim 5, where the first computer instructions when executed by the first processor cause the first processor to perform the following:
   providing the sensitive information to the SDIM; and
   receiving from the SDIM secure information resulting from the SDIM performing the secret function on the provided sensitive information.

7. The peripheral of claim 5, where the unique peripheral information includes a unique serial number for the peripheral.

8. The peripheral of claim 5, where the unique peripheral information includes a private cryptographic key that is part of a public/private key pair uniquely generated for the peripheral.

9. The peripheral of claim 5, where the SDIM includes the second processor and a second memory that includes second computer instructions and identification and security information that is securely stored in the second memory.

10. The peripheral of claim 9, where the second computer instructions when executed by the second processor cause the second processor to perform the following:
    receiving sensitive information;
    performing the secret function on the sensitive information to produce secure information; and
    outputting the secure information.

11. The peripheral of claim 10, where the secret function is a cryptographic function that encrypts the received sensitive information and the secure information is the encrypted sensitive information.

12. The peripheral of claim 10, where the secret function is a hashing function that generates a hash value for the received sensitive information and the secure information includes the hash value.

13. The peripheral of claim 9, where the identification information stored in the second memory includes a unique serial number for the SDIM.

14. The peripheral of claim 5, where the secret function performed by the SDIM is only known by a third party which is different than the party that created the unique peripheral information.

15. The peripheral of claim 5, where the first input device is a card reader adapted to read information from the card.

16. The peripheral of claim 5, further comprising a pin pad device adapted input a personal identification number (PIN) from a user.

17. A computer implemented method of securing sensitive information inputted by a peripheral using a secure device identity module (SDIM) plugged into an internal socket of the peripheral not externally accessible, the method comprising:
- inputting the sensitive information from an input device that is part of the peripheral where a user operates the input device;
- receiving secret information from the SDIM where the secret information includes identification and security information generated by a third party and used by the third party to authenticate the SDIM;
- generating a data record including the inputted sensitive information and the received SDIM identification and security information;
- encrypting the data record using a private encryption key from unique peripheral information; and
- transmitting the encrypted data record, and preventing a peripheral processor of the peripheral from having control or direct access to elements of the SDIM except for the peripheral processor directly communicating with control circuitry of the SDIM over a bus.

18. The method of claim 17, wherein the sensitive information includes credit or debit card and personal identification number (PIN) data entered by the user.

19. The method of claim 17, further comprising:
- receiving from the SDIM secure information generated by a processor on the SDIM executing a secret function that performs a cryptographic function on the sensitive information to produce the secure information.

20. The method of claim 19, wherein the secret function is a cryptographic hashing function and the secure information includes a hash value for the sensitive information.

21. The method of claim 19, wherein the secret function is an encryption function and the secure information includes the sensitive information in encrypted form.

* * * * *